United States Patent [19]

Matui et al.

[11] Patent Number: 4,607,320

[45] Date of Patent: Aug. 19, 1986

[54] POWER SUPPLY DEVICE HAVING A SWITCHED PRIMARY POWER SUPPLY AND CONTROL MEANS FOR MAINTAINING A CONSTANT OFF PERIOD AND A VARIABLE ON PERIOD

[75] Inventors: Toshiro Matui, Kawasaki; Koji Suzuki; Jyoji Nagahira, both of Yokohama; Kunio Yoshihara, Tokyo; Kazuyoshi Takahashi, Kawasaki; Tadashi Ishikawa, Tokyo, all of Japan

[73] Assignee: Canon Kabushiki Kaisha, Tokyo, Japan

[21] Appl. No.: 570,836

[22] Filed: Jan. 16, 1984

[30] Foreign Application Priority Data

Jan. 26, 1983 [JP] Japan .................................. 58-9920

[51] Int. Cl.[4] .................................. H02M 3/335
[52] U.S. Cl. .................................. 363/21; 307/265; 323/288; 363/97
[58] Field of Search .................................. 363/21, 26, 97; 323/288; 307/265; 355/14 CH

[56] References Cited

U.S. PATENT DOCUMENTS

| 3,453,521 | 7/1969 | Schultz et al. | 363/21 |
| 4,253,136 | 2/1981 | Nanko | 363/21 |
| 4,276,586 | 6/1981 | Boekhorst | 363/21 |
| 4,301,497 | 11/1981 | Johari | 363/21 |

FOREIGN PATENT DOCUMENTS

| 147979 | 11/1980 | Japan | 363/21 |
| 201262 | 12/1982 | Japan | 355/14 CH |
| 141678 | 8/1983 | Japan | 363/21 |

Primary Examiner—William H. Beha, Jr.
Attorney, Agent, or Firm—Fitzpatrick, Cella, Harper & Scinto

[57] ABSTRACT

A power supply device has improved power efficiency and stability for use in a copier or the like. The primary power supply to the device being switched with a constant turned-off period to achieve variable power supply control.

5 Claims, 4 Drawing Figures

Tn = Tf

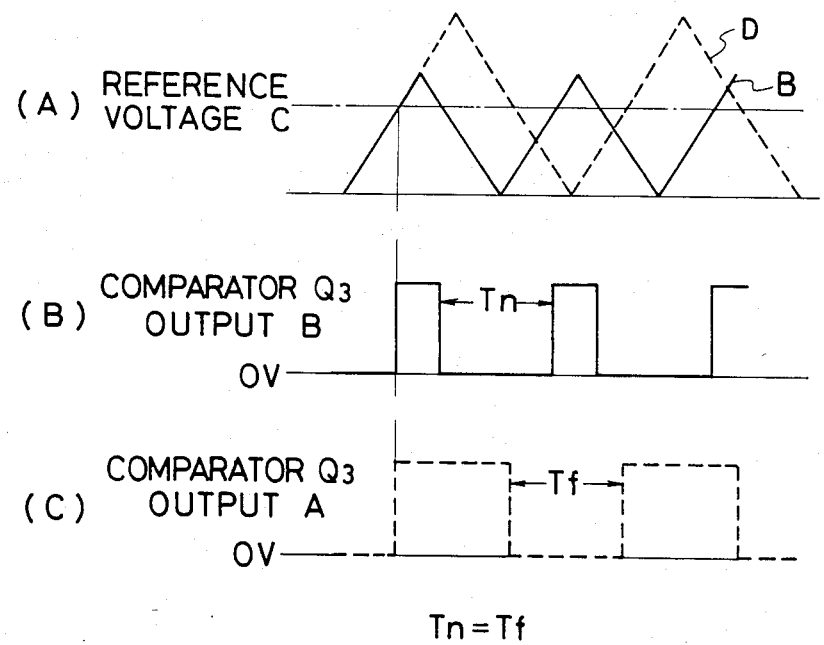

POWER SUPPLY DEVICE HAVING A SWITCHED PRIMARY POWER SUPPLY AND CONTROL MEANS FOR MAINTAINING A CONSTANT OFF PERIOD AND A VARIABLE ON PERIOD

BACKGROUND OF THE INVENTION

1. Field of the Invention

The present invention relates to a power supply device for use as a high voltage source in a copier or the like, and more particularly such power supply device in which a primary power supply is switched and then rectified to obtain a desired DC power supply.

2. Description of the Prior Art

Conventionally the turned-on period of the primary coil of an inverter transformer is controlled by:

(i) changing the frequency of a current supplied to a switching transistor while maintaining a constant turned-on period thereof; or (ii) changing the turned-on period of the switching transistor while maintaining a constant frequency in the current supplied thereto.

The switching wave form of an inverter transformer is known to generally show a resonance depending on the inductance of said inverter transformer. The method (i) does not result in any loss in the power efficiency if the supplied frequency is lower than the resonance frequency since the switching takes place when the resonance voltage of the inductance returns to zero. However, if the supplied frequency is higher than the resonance frequency, the power efficiency becomes deteriorated due to an increased loss in the switching transistor, because the switching tends to take place before the resonance voltage returns to zero. On the other hand, in the method (ii) in which the supplied frequency is maintained constant, the power efficiency may be deteriorated because the switching may take place before the resonance voltage of the inductance returns to zero for a certain turned-on period.

SUMMARY OF THE INVENTION

In consideration of the foregoing, an object of the present invention is to provide a power supply device with improved power efficiency and stability.

Another object of the present invention is to provide a power supply device capable, in obtaining a desired power supply by switching a primary current, of maintaining a constant turned-off period in said switching for achieving power supply control.

The foregoing and still other objects of the present invention will become fully apparent from the following description.

BRIEF DESCRIPTION OF THE DRAWINGS

FIGS. 2(A) to 2(C) are timing charts showing the functions of various parts in the circuit shown in FIG. 1.

DETAILED DESCRIPTION OF THE PREFERRED EMBODIMENTS

Figure 1:
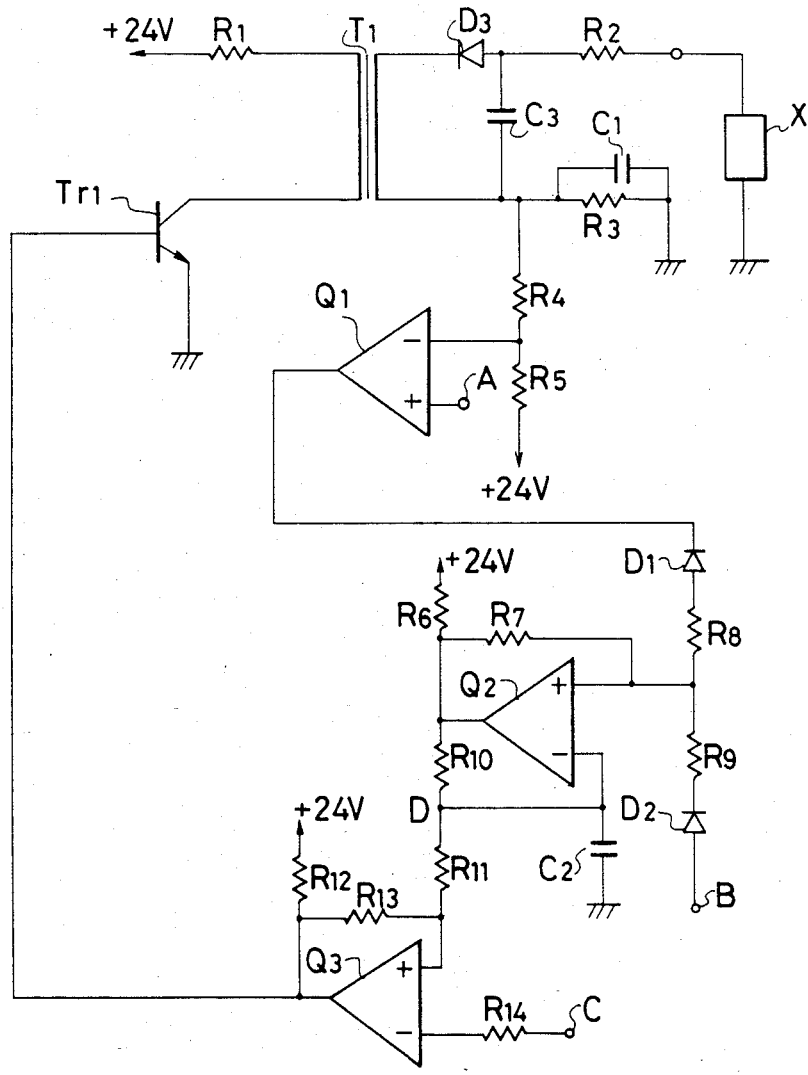
FIG. 1 is a circuit diagram showing an embodiment of the power supply device of the present invention.

Now the present invention will be clarified in greated detail by an embodiment thereof shown in the attached drawings.

FIG. 1 is a circuit diagram showing an embodiment of the present invention, wherein shown are a differential amplifier Q1 composed of an operational amplifier; comparators Q2, Q3 composed of operational amplifiers; an inverter transformer T1; a switching transistor Tr1 connected to the primary side of said inverter transformer T1; diodes D1–D3; condensers C1–C3; resistors R1–R14; a reference voltage A for the differential amplifier Q1; a reference voltage B supplied to the resistor R9 through the diode D2; a reference voltage C for the comparator Q3; and a load X for example a corana charger. Although not illustrated in particular, a condenser and a diode are externally connected between the transformer T1 and the ground, parallel to the transistor Tr1.

In the following there will be given an explanation on the function of the above-described embodiment.

In response to the actuation of a copy start key for example, the transistor Tr1 is turned on and a current flows in the transformer T1 to accumulate energy therein. Then, when the transistor Tr1 is turned off, the energy accumulated in the transformer T1 is released with a sinusoidal oscillation of a constant frequency determined by the inductance L of the transformer T1 and the capacitance C of the exteral condenser. The amplitude of said oscillation varies according to the turned-on period of the transistor Tr1, but the duration of the positive portion in a cycle is constant.

The resistors R4, R5 detect the load current of the transformer T1, and the differential amplifier Q1 amplifies the difference between a voltage corresponding to said load current and the reference voltage A in such a manner as to maintain a constant output load current as will be explained later. The output voltage of the differential amplifier Q1 and the reference voltage B are supplied, through the diodes D1, D2 in an "or"connection, to the non-inverted input port of the comparator Q2, so that the level at said non-inverted input port varies according to the magnitudes of said output voltage and of said reference voltage B. Said comparator Q2 releases an "H"-level or "L"-level signal according to the level of said non-inverted input port and that of the inverted input port. The condenser C2 is charged and discharged in response to the output of said comparator Q2 to generate a sawtooth wave voltage at a point D, as shown in FIG. 2(A). The time constant of said sawtooth wave is determined by the condenser C2 and the resistor R10. The maximum value of said sawtooth wave depends on the level at the non-inverted input port of the comparator Q2. The sawtooth wave thus obtained is supplied to the non-inverted input port of the comparator Q3 for comparison with the reference voltage C, and the base of the switching transistor Tr1 is controlled according to the result of said comparison in the comparator Q3.

FIG. 2 is a timing chart showing the functions of various parts in the above-described circuit. As shown in the chart (A), the sawtooth wave assumes a broken-lined form D for obtaining a constant load current for a large load, or a full-lined form B for an ordinary load. The slope of the sawteeth is determined by the condenser C2 and the resistor R10 both for the broken line D and for the full line B. Such output voltage of the comparator Q2 is compared with the reference voltage C in the comparator Q3. The chart (B) shows the output square wave of the comparator Q3 corresponding to the full-lined output voltage B of the comparator Q2, while the chart (C) shows the output square wave corresponding to the broken-lined output voltage D of the comparator Q2. Such output square wave is applied to the base of the switching transistor Tr1 to control the turned-on period of the transformer T1, thereby obtaining a constant load current.

In the above-described embodiment, the turned-off periods Tn, Tf of the output square wave are always constant a shown in the charts (B) and (C) in FIG. 2, because the reference voltage C for the comparator Q3 is maintained constant. In this manner the switching transistor Tr1 is controlled with a constant turned-off period determined in response to the duration of the positive portion of a cycle in the aforementioned sinusoidal oscillation and with a varying turned-on period, whereby the power efficiency is improved and the power loss is reduced in comparison with the conventional methods of varying the frequency while maintaining a constant turned-on period or of varying the turned-on period while maintaining a constant frequency.

The present invention is not limited to the foregoing embodiment but is applicable also to a chopper-type switched power source by replacing the transformer T1 with an inductance and by incorporating the switching transistor Tr1 into a power supply circuit.

As explained in the foregoing, there is obtained a power supply device with an improved power efficiency in comparison with the conventional control methods since, in obtaining a desired DC power by switching and then rectifying a DC primary power, the switching means is controlled with a constant turned-off period and with a varying turned-on period. Also in case said power supply device comprises a transformer, there is obtained an additional advantage of improved stability, particularly in a high voltage source, combined with the aformentioned improved efficiency, by controlling the turned-on period of the primary side of said transformer in such a manner as to obtain a constant secondary output voltage or a constant load current in the secondary output circuit.

What we claim is:

1. A power supply device comprising:
    a transformer for obtaining a desired power from a primary supply power;
    switching means for switching the power supplied to a primary side of said transformer;
    detecting means for detecting a current passing through a load connected to a secondary side of said transformer;
    means for amplifying the difference between a voltage signal corresponding to the current passing through said load and a reference voltage and generating an output signal corresponding to the difference;
    signal generating means for generating a signal with a sawtooth wave form in accordance with the output signal; and
    control means for comparing a level of the sawtooth signal from said signal generating means with a reference level and controlling said switching means in accordance with the comparison result, said control means being operable to maintain constant a turned-off period of said switching means and vary a turned-on period of said switching means.

2. A power supply device according to claim 1, wherein said switching means is adapted to turn on and off the power supply to the primary side of said transformer, whereby a sinusoidal voltage wave of a determined frequency appears in said switching means and in the primary side of said transformer during the turned-off period of said switching means.

3. A power supply device according to claim 1, further comprising rectifying means on the secondary side of said transformer, wherein said load is driven by the output of said rectifying means.

4. A power supply device according to claim 1, wherein a maximum level of the sawtooth signal from said signal generating means varies according to the output of said detecting means.

5. A power supply device according to claim 4, wherein the slope of said sawtooth wave is constant regardless of the output of said detecting means.

* * * * *